US008797134B2

(12) United States Patent
Oh et al.

(10) Patent No.: US 8,797,134 B2
(45) Date of Patent: Aug. 5, 2014

(54) FIELD COIL ASSEMBLY OF ELECTROMAGNETIC CLUTCH FOR POWER TRANSMISSION APPARATUS AND MANUFACTURING METHOD THEREOF

(75) Inventors: Sung-Taeg Oh, Daejeon (KR);
 Seong-Gyu Gong, Daejeon (KR);
 Suk-Jae Chung, Daejeon (KR);
 Seung-Kil Kim, Daejeon (KR);
 Chung-Han Shin, Daejeon (KR);
 Jong-Myung Seok, Daejeon (KR);
 Dae-Yong Park, Daejeon (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 402 days.

(21) Appl. No.: 12/973,602

(22) Filed: Dec. 20, 2010

(65) Prior Publication Data
 US 2011/0148562 A1 Jun. 23, 2011

(30) Foreign Application Priority Data
 Jun. 15, 2010 (KR) ........................ 10-2010-0056732

(51) Int. Cl.
 *H01F 5/04* (2006.01)
 *F16D 27/10* (2006.01)
(52) U.S. Cl.
 CPC . *H01F 5/04* (2013.01); *F16D 27/10* (2013.01)
 USPC ........... 336/192; 335/296; 335/299; 336/107; 192/84.1; 192/84.96
(58) Field of Classification Search
 CPC .................................. H01F 5/04; F16D 27/10
 USPC .......... 335/296, 299; 336/107, 192; 192/84.1, 192/84.96
 See application file for complete search history.

(56) References Cited

U.S. PATENT DOCUMENTS

| 3,566,008 | A | 2/1971 | Ettlinger |
| 4,013,212 | A | 3/1977 | Miller |
| 5,812,044 | A * | 9/1998 | Sakamoto ..................... 335/299 |
| 2006/0208838 | A1 | 9/2006 | Beuscher et al. |
| 2009/0212896 | A1 | 8/2009 | Tamura et al. |
| 2009/0243773 | A1 | 10/2009 | Chung et al. |
| 2009/0278640 | A1 * | 11/2009 | Oh et al. ...................... 335/220 |
| 2010/0065397 | A1 | 3/2010 | Oh |

FOREIGN PATENT DOCUMENTS

| CN | 1748343 A | 3/2006 |
| CN | 101438074 A | 5/2009 |
| CN | 101599336 A | 12/2009 |
| JP | 2002-343456 A | 11/2002 |
| JP | 2009-273354 A | 11/2009 |
| KR | 10-2008-0106765 A | 12/2008 |
| KR | 10-2009-0078375 A | 7/2009 |
| KR | 10-2009-0079051 A | 7/2009 |
| KR | 10-2009-0104543 A | 10/2009 |
| WO | WO 2007/126216 A1 | 11/2007 |

* cited by examiner

*Primary Examiner* — Ramon Barrera
(74) *Attorney, Agent, or Firm* — Birch, Stewart, Kolasch & Birch, LLP

(57) ABSTRACT

Disclosed is a field coil assembly of an electromagnetic clutch including a bobbin from which lead wires, which are both ends of a coil made of an aluminum-based material, protrude outward, a core that surrounds the bobbin such that the lead wires are exposed, a bobbin terminal installed at the bobbin while being adjacent to the lead wire of the coil, and a connector coupled to the core and including a lead wire terminal. The lead wires of the coil are connected to the bobbin terminal through heating and pressing.

9 Claims, 10 Drawing Sheets

FIELD COIL ASSEMBLY OF ELECTROMAGNETIC CLUTCH FOR POWER TRANSMISSION APPARATUS AND MANUFACTURING METHOD THEREOF

BACKGROUND OF THE INVENTION

1. Field of the Invention

The present invention relates to a field coil assembly of an electromagnetic clutch for a power transmission apparatus, and more particularly to a field coil assembly in which a lead wire of a coil for generating electromagnetic force in an electromagnetic clutch can be stably connected to a lead wire terminal of a connector for applying external power to the coil.

2. Description of the Prior Art

In general, an electromagnetic clutch for power transmission is an electric device for transferring driving force of a pulley rotated by an engine of a vehicle to a hub disc of a compressor driving shaft. If the electromagnetic clutch is powered on, a magnetic field is generated by electromagnetic induction of a winding coil, and the hub disc of the compressor driving shaft is attracted toward a frictional surface of the pulley by magnetic force due to the magnetic field, so that power of the engine is transmitted to a rotating shaft of the compressor. In addition, the electromagnetic clutch controls the operation of a cooling system of an air conditioning apparatus by regulating power of the compressor according to whether power is applied to the coil.

FIG. 1 is a perspective view illustrating the configuration of a field coil assembly of an electromagnetic clutch for a compressor according to the conventional art. As illustrated in FIG. 1, a bobbin 10 is installed at a core 1 forming a frame of the field coil assembly and includes a coil made of an aluminum (Al)-based material. The coil is obtained by repeatedly winding a wire and has a substantially ring shape, and both ends of the wire are drawn to form two lead wires W. The lead wires W are electrically connected to a lead wire terminal 26 of a connector 20 through bobbin terminals 15 of the bobbin 10 which will be described later.

The coil is surrounded by the bobbin 10. The bobbin 10 is provided at one side thereof with a coupling portion 11. The coupling portion 11 is a part at which the bobbin terminals 15 are installed and protrudes from one side of the bobbin 10 as illustrated in FIG. 1. The pair of lead wires W of the coil protrude through the coupling portion 11.

The bobbin terminals 15 are installed at the coupling portion 11. The bobbin terminals 15 are mounted on the coupling portion 11 to surround and fix the lead wires W. Furthermore, the bobbin terminals 15 are electrically connected to the lead wire terminal 26 of the connector 20 and thus electrically connect the coil to the connector 20. The bobbin terminal 15 is made of a copper (Cu)-based material. The lead wires W are connected to the bobbin terminals 15 by a soldering process.

The connector 20 is coupled to one side of the core 1 to transfer external power to the coil. The connector 20 includes a holder 22 coupled to the core 1, the lead wire terminal 26 coupled to the holder 22, and a clip 30 fixed to the holder 22.

The holder 22 is connected to the connector 20 and has a plate shape. The holder 22 is provided at the front end thereof with locking hooks 24 and on the upper surface thereof with connection portions 26' of the lead wire terminal 26. The locking hook 24 corresponds to a locked hook 17 of the core 1, and is locked with the locked hook 17 to allow the connector 20 to be temporarily fixed to the core 1. The holder 22 is provided with a guide boss 28. The guide boss 28 guides the coupling of the clip 30 and extends vertically from the upper surface of the holder 22 as illustrated in FIG. 1.

The lead wire terminal 26 includes the connection portions 26' and splicing portions 26". The connection portions 26' provided at one side of the lead wire terminal 26 substantially make contact with the bobbin terminals 15 and have a substantially plate shape as illustrated in FIG. 1. The splicing portions 26" extending from the connection portions 26' surround and fix cables W' and simultaneously are electrically connected to the core wires of the cables W'. Meanwhile, the clip 30 is coupled to the holder 22. The clip 30 is coupled to the holder 22 while interposing the lead wire terminal 26 therebetween, thereby fixing the lead wire terminal 26.

However, the above-described conventional art has the following problems.

Since the melting point of the lead wires W of the coil is different from the melting point of the bobbin terminals 15, the lead wires W may not be firmly connected the bobbin terminals 15 at the time of soldering. Furthermore, since the bobbin terminals 15 and the lead wire terminal 26 are connected to each other only by the soldering process, a connection between the bobbin terminal 15 and the lead wire terminal 26 may be cut by impact such as vibration applied from an outside.

SUMMARY OF THE INVENTION

Accordingly, the present invention has been made to solve the above-mentioned problems occurring in the prior art, and the present invention provides a field coil assembly for a compressor capable of stably maintaining an electrical connection for the supply of electricity. The object can be achieved by firmly and stably forming an electrical contact point between a lead wire (an end of a coil of the field coil assembly) and a terminal through which a current is supplied from an outside, resulting in the improvement of the operation reliability of the compressor.

In accordance with an aspect of the present invention, there is provided a method for manufacturing a field coil assembly of an electromagnetic clutch including: coupling lead wires, which are both ends of a coil made of an aluminum-based material, to a bobbin such that the lead wires protrude outward; coupling the bobbin to a core such that the core surrounds the bobbin; and connecting the lead wires to a non-aluminum connector terminal for applying a current to the coil through heating and pressing.

According to another embodiment of the present invention, the method further includes forming a solder layer on a core wire protruding outward from the lead wire.

Preferably, the solder layer is formed by dipping the core wire of the lead wire in a solder solution. More preferably, the solder layer is formed by dipping the core wire in a solder solution bath including an ultrasonic generator.

Furthermore, the forming the solder layer is performed before the coupling of the coil to the bobbin.

According to further another embodiment of the present invention, the connector terminal includes a bobbin terminal and a lead wire terminal, and the method further includes electrically connecting the bobbin terminal to the lead wire terminal.

In accordance with another aspect of the present invention, there is provided a field coil assembly of an electromagnetic clutch, including: a bobbin from which lead wires, which are both ends of a coil made of an aluminum-based material, protrude outward; a core that surrounds the bobbin such that the lead wires are exposed; a bobbin terminal installed at the bobbin while being adjacent to the lead wire of the coil; and a connector coupled to the core and including a lead wire terminal, wherein the lead wires of the coil are connected to the bobbin terminal through heating and pressing.

According to an embodiment of the present invention, the bobbin terminal includes a body fixed onto the bobbin, and a connection rib extending horizontally from the body to surround the lead wires.

According to another embodiment of the present invention, the bobbin terminal includes a body fixed onto the bobbin, a lead wire mounting portion extending from the body to surround the lead wires, and a close contact portion extending from the lead wire mounting portion in parallel to the body.

According to further another embodiment of the present invention, a solder layer is formed at a core wire of a front end of the lead wire.

Preferably, the solder layer is formed by dipping the core wire of the lead wire in a solder solution. More preferably, the solder layer is formed by dipping the core wire in a solder solution bath including an ultrasonic generator.

According to further another embodiment of the present invention, the connector includes a holder fixed at one side of the core, and a clip coupled to the holder while fixedly interposing the lead wire terminal therebetween, wherein the holder is provided with a guide boss and a fixing boss, the clip is formed with a guide hole and a coupling hole into which the guide boss and the fixing boss are inserted, and the holder and the clip are fixed to each other by fusing process.

According to further another embodiment of the present invention, the bobbin terminal is formed with a mounting recess and a connection portion provided at a front end of the lead wire terminal is locked with the mounting recess.

Furthermore, according to further another embodiment of the present invention, the bobbin terminal includes a mounting plate having an upper surface on which a connection portion provided at a front end of the lead wire terminal is mounted, and a coupling member extending from both sides of the mounting plate to support a side surface and an upper surface of the connection portion.

Advantageous Effects

According to the present invention as described above, since the core wire of the lead wire of the coil is connected to the bobbin terminal through the fusing process by applying heat and pressure, it is possible to achieve a more stable electrical connection state as compared with a connection using soldering, resulting in the improvement of the operation reliability of an electromagnetic clutch for a compressor.

Furthermore, according to the present invention, the lead wire is connected to a terminal after a solder layer is coated on the core wire of the lead wire. At this time, since the solder layer is deformed in a pressing and heating process and the lead wire is connected to the terminal, a firm connection state can be achieved even if the lead wire and the terminal are made of materials different from each other, and an electrical connection state can be stabilized.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, a field coil assembly of an electromagnetic clutch for power transmission according to a preferred embodiment of the present invention will be described with reference to the accompanying drawings. In the following description of the embodiment, an example in which an electromagnetic clutch of the present invention is used for a compressor for a vehicle will be described.

Figure 1:
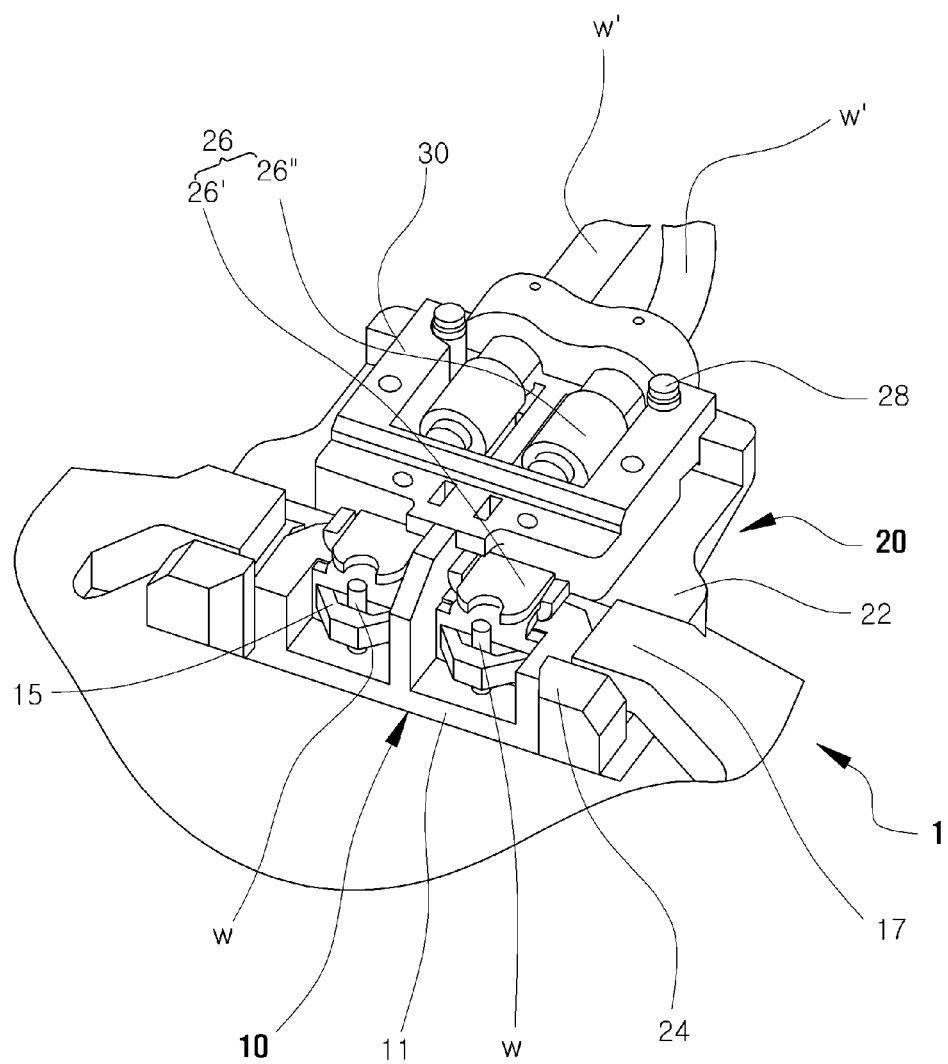
FIG. 1 is a perspective view illustrating the configuration of a field coil assembly of an electromagnetic clutch for a compressor according to the conventional art.
Figure 2:
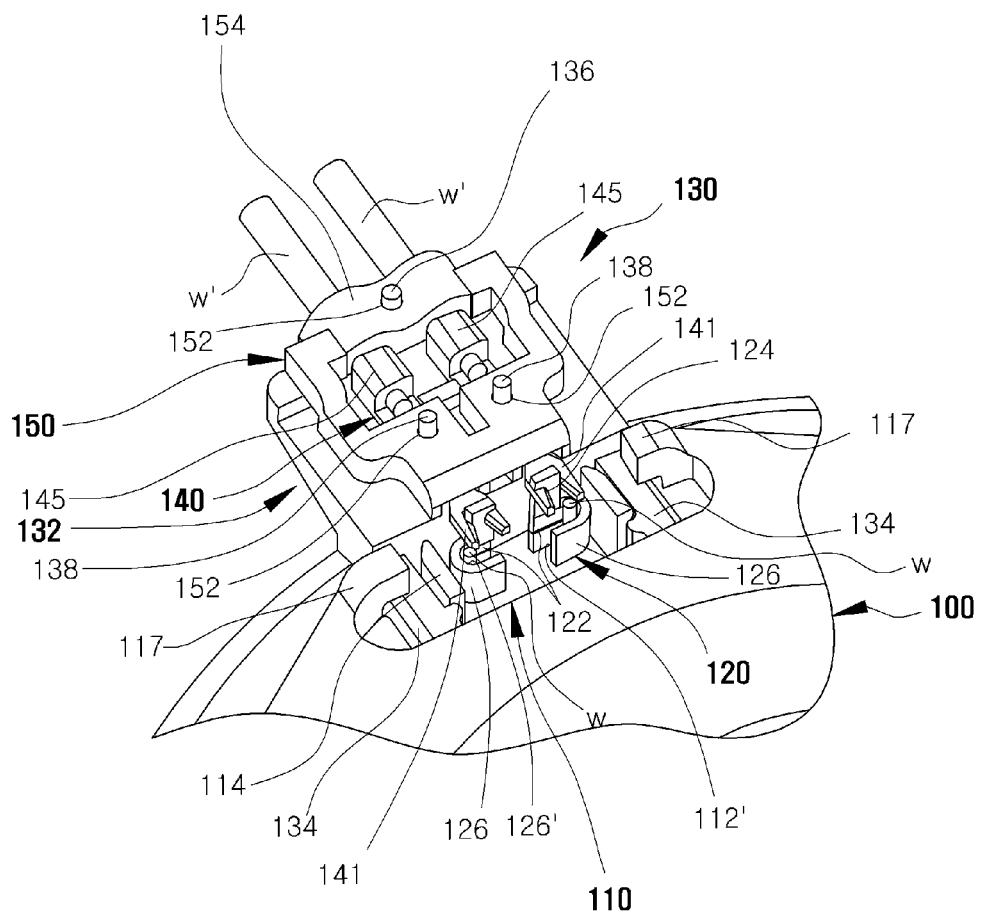
FIG. 2 is a perspective view illustrating the configuration of main elements of a field coil assembly of an electromagnetic clutch for a compressor according to the present invention.
Figure 3:
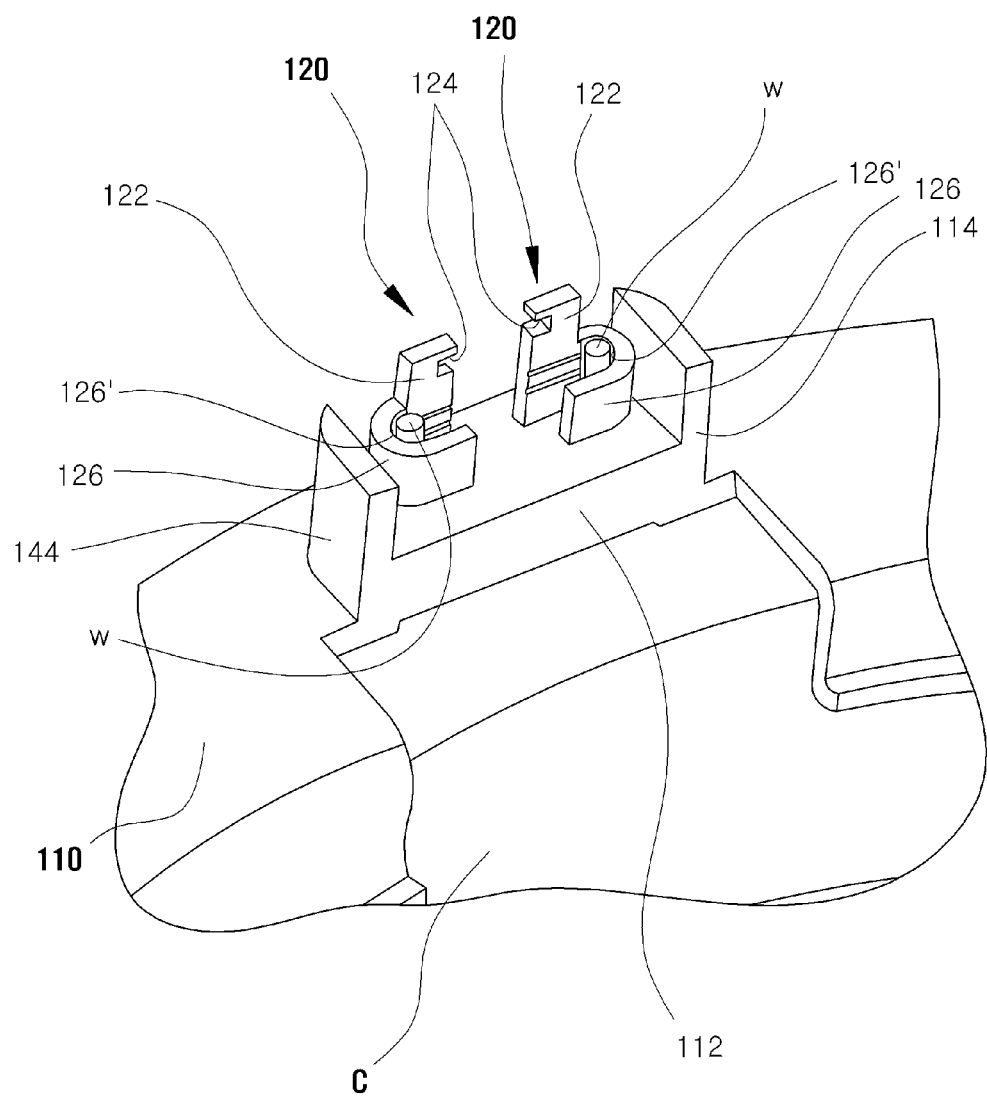
FIG. 3 is a perspective view illustrating the configuration of main elements according to an embodiment of the present invention.
Figure 4:
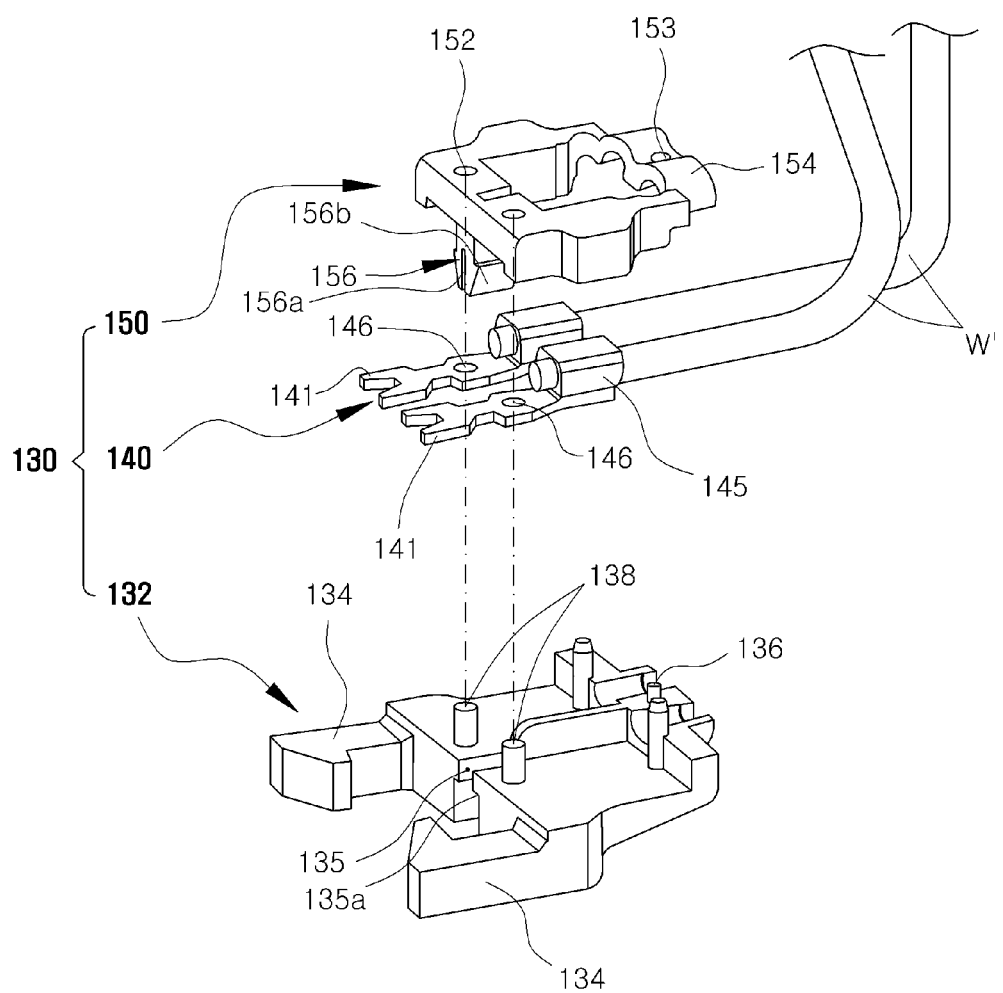
FIG. 4 is an exploded perspective view illustrating the configuration of a connector according to an embodiment of the present invention.
Figure 5:
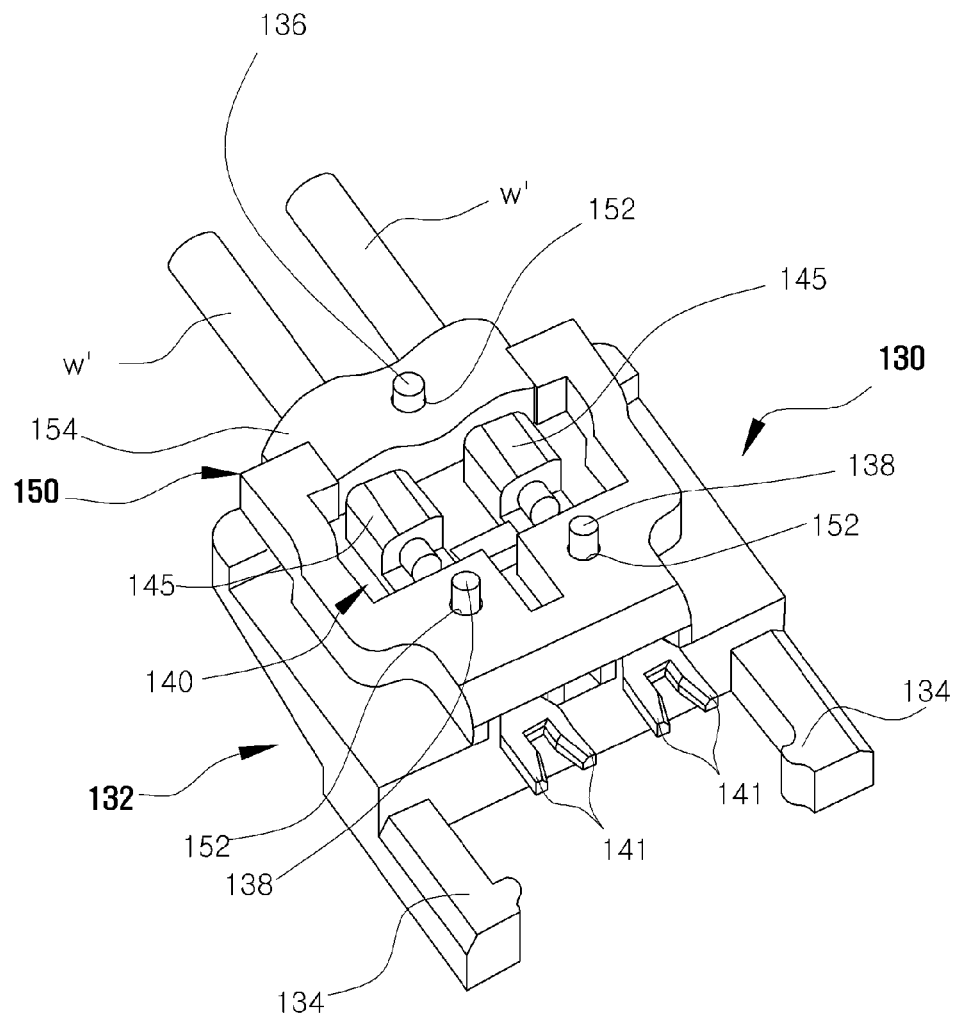
FIG. 5 is a perspective view illustrating the configuration of a connector according to an embodiment of the present invention.

FIG. 2 is a perspective view illustrating the configuration of main elements of a field coil assembly of an electromagnetic clutch for power transmission according to the present invention, FIG. 3 is a perspective view illustrating the configuration of main elements according to the embodiment of the present invention, FIG. 4 is an exploded perspective view illustrating the configuration of a connector according to the embodiment of the present invention, and FIG. 5 is a perspective view illustrating the configuration of a connector according to the embodiment of the present invention.

As illustrated in FIGS. 2 and 3, a core 100 forming an external appearance of a field coil assembly of an electromagnetic clutch includes a bobbin 110 having a coil C therein. A fixing cover (not shown) is coupled to the bobbin 110 while interposing the coil C therebetween to support the coil C. The bobbin 110 and the fixing cover are not formed separately from the coil C, and may be integrally formed with the coil C or may also be omitted.

The coil C is obtained by repeatedly winding a unit wire therein, has a substantially ring shape and is made of an aluminum (Al)-based material. Two pieces of wires are drawn from the coil C to form lead wires W. The lead wires W are electrically connected to a lead wire terminal 140 of a connector 130 through a bobbin terminal 120 of the bobbin 110 which will be described later.

The bobbin 110 is provided to surround a part of an outer surface of the coil C and has a support portion 112 at one side thereof. The support portion 112 is a part to which the bobbin terminal 120 is coupled and protrudes outward from one side of the bobbin 110. A pair of lead wires W forming both ends of the coil C protrude through the support portion 112. The support portion 112 of the bobbin 110 is provided at both sides thereof with support ribs 114. The support ribs 114 extend vertically from the upper surface of the support portion 112. A locking hook 134 of a holder 132 is to be locked at the support ribs 114, which will be described later.

A pair of bobbin terminals 120 corresponding to the pair of lead wires W are installed at the support portion 112. The bobbin terminals 120 are supported by the support portion 112 to surround and support the lead wires W. The bobbin terminals 120 are electrically connected to the lead wire terminal 140 of the connector 130 to electrically connect the coil C to the connector 130. The bobbin terminals 120 are made of a copper (Cu)-based material.

Each bobbin terminal 120 is provided with a body 122 coupled to the support portion 112 of the bobbin 110. Each body 122 has a plate shape and a lower end portion of the body 122 is inserted into the support portion 112 and fixed thereto. Each body 122 is formed with a mounting recess 124 and a connection portion 141 of the lead wire terminal 140 is locked with the mounting recess 124. In the embodiment, the mounting recess 124 face each other in the pair of bobbin terminals 120. In the state in which the connection portions 141 of the lead wire terminal 140 are locked with the mounting recess 124 of the bodies 122, the lead wire terminal 140 is electrically connected to the bobbin terminals 120 by a soldering or fusing process.

Each bobbin terminal 120 is provided with a connection rib 126. The connection rib 126 is formed to extend from one side of the body 122 and surround the lead wire W of the coil C, and fixes the lead wire W to the bobbin terminal 120. The connection rib 126 according to the embodiment is bent in a substantially semicircular shape and a front end portion of the connection rib 126 extends in parallel to the body 122. Consequently, the lead wire W of the coil C can be inserted into an insertion space 126' defined between the connection rib 126 and the body 122. In the state in which the lead wire W of the coil C is inserted into the insertion space 126', the connection rib 126 is fused through a pressing and heating process, so that the connection rib 126 and the lead wire W can be electrically connected with each other while being deformed. In the present invention, since the bobbin terminal 120 is connected to the lead wire W by a fusing process, the cover of the coil C is melted in the fusing process without stripping the cover of the coil C, so that the bobbin terminal 120 is easily connected to the lead wire W.

The connector 130 is coupled to one side of the core 100. The connector 130 is coupled to the core 100 to transfer external power to the coil. As illustrated in FIG. 4, the connector 130 includes the holder 132 coupled to the core 100, the lead wire terminal 140 mounted on the holder 132, and a clip 150 fixed to the holder 132 while interposing the lead wire terminal 140 therebetween.

The holder 132 is connected to the bobbin 110 and has a substantially plate shape. The holder 132 supports the connector 130 by connecting the whole connector 130 to the bobbin 110, and simultaneously supports the lead wire terminal 140 assembled to the holder 132 on the upper surface of the holder 132. The holder 132 is provided at the front end thereof with a pair of locking hooks 134. The locking hooks 134 are elastically locked with the support ribs 114 of the support portion 112, so that the connector 130 can be fixed to the bobbin 110. The locking hooks 134 are inserted into the lower surface of locked hooks 117 extending from the core 100 while facing the core 100 and supported between the outer side surface of the bobbin 110 and the locked hooks 117, so that the connector 130 is fixed to the core 100.

That is, the locking hooks 134 are coupled to the support ribs 114 to prevent horizontal movement of the holder 132, and coupled to the locked hooks 117 of the core 100 to prevent vertical movement of the holder 132 when viewed from FIGS. 2 and 3. As described above, the locking hooks 134 are simultaneously coupled to the locked hooks 117 and the support ribs 114, so that the connector 130 can be stably coupled to the bobbin 110.

A slit 135 is formed at the center portion of the holder 132 and locking protrusions 135a are formed at both sides of the lower end portion of the slit 135. The slit 135 is a part into which a coupling hook 156 of the clip 150 is inserted. In the state in which the coupling hook 156 is inserted into the slit 135, the coupling hook 156 is elastically locked with the locking protrusions 135a, so that the clip 150 is coupled to the holder 132 while interposing the lead wire terminal 140 therebetween.

The holder 132 is provided on the upper surface thereof with a guide boss 136. The guide boss 136 guides the coupling of the clip 150 and extends vertically from the upper surface of the holder 132 as illustrated in FIG. 4. The guide boss 136 is inserted into a guide hole 153 of the clip 150. The holder 132 is provided with a fixing boss 138, and in the embodiment, the fixing boss 138 is prepared as a pair. The fixing bosses 138 extend upward from the upper surface of the holder 132. The fixing bosses 138 are inserted into coupling holes 152 of the clip 150 by passing through fixing holes 146 of the lead wire terminal 140. Consequently, the fixing bosses 138 of the holder 132 fix the lead wire terminal 140 and allow the clip 150 to be fixed to the holder 132. As described above, in the state in which the guide boss 136 is inserted into the guide hole 153 and the fixing bosses 138 are inserted into the coupling holes 152, the clip 150 can be firmly fixed to the holder 132 by a fusing process.

The lead wire terminal 140 fixed between the holder 132 and the clip 150 as described above is made of a copper (Cu)-based material. The lead wire terminal 140 includes the connection portions 141 coupled to the bobbin terminal 120 and splicing portions 145 extending from the connection portions 141. The splicing portions 145 support cables W' through which power is supplied from on outside by clamping the cables W', and simultaneously are electrically coupled to the core wires of the cables. The connection portions 141 are locked with the mounting recess 124 of the bobbin terminals 120 to allow the lead wire terminal 140 and the bobbin terminals 120 to be electrically connected to each other. The connection portions 141 and the bobbin terminals 120 are electrically connected to each other by a soldering or fusing process.

As described above, the lead wire terminal 140 including the connection portions 141 and the splicing portions 145 are provided as a pair while being spaced apart from each other at a predetermined interval. The lead wire terminal 140 are formed with the fixing holes 146 into which the fixing boss 138 of the holder 132 are inserted.

Meanwhile, the clip 150 is coupled to the holder 132. The clip 150 is coupled to the holder 132 while interposing the lead wire terminal 140 therebetween to fix the lead wire terminal 140. The clip 150 is formed with the coupling holes 152 and the guide hole 153. The coupling holes 152 and the guide hole 153 are formed through the clip 150 in the direction in which the clip 150 is coupled to the holder 132. The coupling holes 152 and the guide hole 153 are formed at positions corresponding to the fixing bosses 138 and the guide boss 136. The guide hole 153 and the coupling holes 152 are parts into which the guide boss 136 and the fixing bosses 138 are inserted and guide the assembly of the clip 150 and the holder 132. In the state in which the clip 150 and the holder 132 are assembled to each other, the clip 150 is fixed to the holder 132 by a fusing process.

The clip 150 is provided with a guide member 154. The lower surface of the guide member 154 is recessed such that the cables W' through which electricity is supplied from on outside can be supported in a fixed state. The guide member 154 stably support the cables W' by surrounding a part of the outer surface of the cables W' as illustrated in FIG. 5.

The coupling hook 156 formed at the lower surface of the clip 150 is coupled to the holder 132 as described above. That is, if the coupling hook 156 is inserted into the slit 135, a pair of hook legs 156b spaced apart from each other by a separation slit 156a are elastically deformed against each other so that the distance between the hook legs 156b may be narrowed, and the coupling hook 156 is locked with the locking protrusions 135a in the state in which the coupling hook 156 is inserted in the slit 135 of the holder 132, so that the clip 150 is coupled to the holder 132.

An assembly procedure of the field coil assembly of the electromagnetic clutch for the compressor according to the invention as described above will be sequentially described below.

In order to complete the assembly of the bobbin 110, a coil is assembled in the bobbin 110 and end portions of the coil, that is, the lead wires W protrude outward from the bobbin 110. The bobbin terminals 120 are coupled to the support portion 112 of the bobbin 110 and the lead wires W of the coil are inserted into the insertion spaces 126' of the connection ribs 126 of the bobbin terminals 120. In this way, since the lead wires W are immediately supported by the connection ribs 126 of the bobbin terminals 120, it is little probable that the lead wires W will be bent or damaged by external force. A worker installs an assembly formed of the coil C and the bobbin 110 at the core 100. That is, the assembly formed of the coil C and the bobbin 110 is inserted into and mounted on an empty space of the core 100.

In such a state, the connector 130 is assembled to the core 100. That is, the connector 130 is assembled to the positions at which the bobbin terminals 120 are installed, so that the bobbin terminals 120 are electrically connected to the lead wire terminal 140 of the connector 130. In such a process, it is necessary to first assemble the connector 130, which will be described below. The lead wire terminal 140 is mounted on the holder 132. That is, the fixing bosses 138 of the holder 132 are inserted into the fixing holes 146 of the lead wire terminal 140, so that the lead wire terminal 140 is fixed to the holder 132.

Then, the clip 150 is coupled to the holder 132 while interposing the lead wire terminal 140 therebetween. The guide boss 136 and the fixing bosses 138 of the holder 132 are inserted into the guide hole 153 and the coupling holes 152 of the clip 150, respectively. The coupling state of these elements is illustrated in FIG. 5. In such a state, the guide boss 136 and the fixing bosses 138 are thermally fused, so that the lead wire terminal 140 can be firmly fixed between the holder 132 and the clip 150.

In the process of assembling the connector 130 assembled as above to the core 100, the locking hooks 134 of the connector 130 are locked with the support ribs 114 of the support portion 112 while surrounding the outer sides of the support ribs 114 and simultaneously inserted into the lower surface of the locked hooks 117 of the core 100 to maintain a stable state. The connection portions 141 of the lead wire terminal 140 are locked with the mounting recess 124 of the bodies 122 of the bobbin terminals 120, respectively.

In such a state, a worker electrically connects the lead wires W and the connection ribs 126 of the bobbin terminals 120 by performing a fusing process while applying pressure and heat to the connection portions of the lead wires W and the connection ribs 126 of the bobbin terminals 120. The lead wires W are integrally formed with the connection ribs 126 through the fusing operation, so that sufficient strength can be ensured and simultaneously a stable electrical connection state can be achieved between the lead wires and the bobbin terminals. The connection portions 141 of the lead wire terminal 140 can be electrically connected to the bobbin terminals 120 by a soldering or fusing process. Last, a worker performs an insert molding process in the state in which the coil C is inserted into the core 100 to seal the connection portions of the lead wires W and the connection ribs 126 and simultaneously cover a portion of the connector 130 exposed to an outside, thereby manufacturing a cover (not shown) of the connector 130.

According to the invention as described above, since cores of the lead wires W of the coil C are connected to the bobbin terminals 120 by a pressing and heating process, it is not necessary to strip the cover of the lead wires W of the coil C in order to connect the cores of the lead wires W of the coil C to the bobbin terminals 120. Furthermore, since the cores of the lead wires W of the coil C are integrally formed with the bobbin terminals 120 by a fusing process, structural strength can be sufficiently ensured.

If external power is supplied to the field coil assembly assembled as described above through the connector 130, the lead wire terminal 140 of the connector 130 is electrically connected to a terminal of a counterpart connector, and simultaneously the lead wire terminal 140 is connected to the lead wires W through the bobbin terminals 120, so that the external power is supplied to the coil C.

As the external power is supplied to the coil C, the coil C wound by the wire generates a magnetic field, the hub disc of a compressor driving shaft is attracted toward the frictional surface of a pulley by magnetic force so as to be dynamically connected to the pulley. Consequently, driving force of the pulley rotated by an engine is transferred to the compressor, resulting in the operation of the compressor.

Figure 6A:
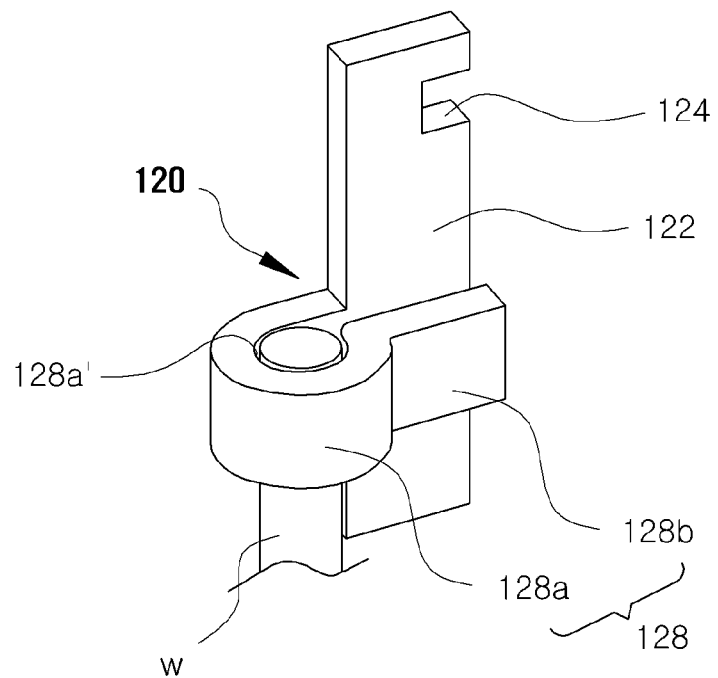
FIGS. 6a and 6b are perspective views illustrating the configuration of main elements according to another embodiment of the present invention.

Next, a bobbin terminal according to another embodiment will be described with reference to FIG. 6a. The same reference numerals are used to designate the same elements as those of the bobbin terminal described in the previous embodiment throughout the drawings. As illustrated in FIG. 6a, a bobbin terminal 120 according to another embodiment includes the body 122 fixed to the upper surface of the support portion 112 of the bobbin 110, and a connection rib 128 extending from an intermediate portion of the body 122. The connection rib 128 includes a lead wire mounting portion 128a extending from one side of the body 122 to surround the outer peripheral surface of a lead wire W, and a close contact portion 128b further extending from the lead wire mounting portion 128a.

The lead wire mounting portion 128a has a substantially circular shape corresponding to the external appearance of the lead wire W. Since the lead wire mounting portion 128a has the substantially circular shape, an internal space 128a' is defined in the inner side of the lead wire mounting portion 128a, and the lead wire W of the coil C is inserted into the internal space 128a'. The lead wire W is inserted into the internal space 128a', so that an interval between the outer surface of the lead wire W and the inner surface of the lead wire mounting portion 128a is constantly maintained. The close contact portion 128b extends from the front end of the lead wire mounting portion 128a in parallel to the body 122. Thus, if the connection rib 128 is fused through heating and pressing in the state in which the lead wire W of the coil C is inserted into the internal space 128a' of the lead wire mounting portion 128a, the close contact portion 128b is closely connected to the body 122 and the lead wire W of the coil C is deformed so as to be connected to the lead wire mounting portion 128*a* as illustrated in FIG. 6*b*.

Figure 6B:
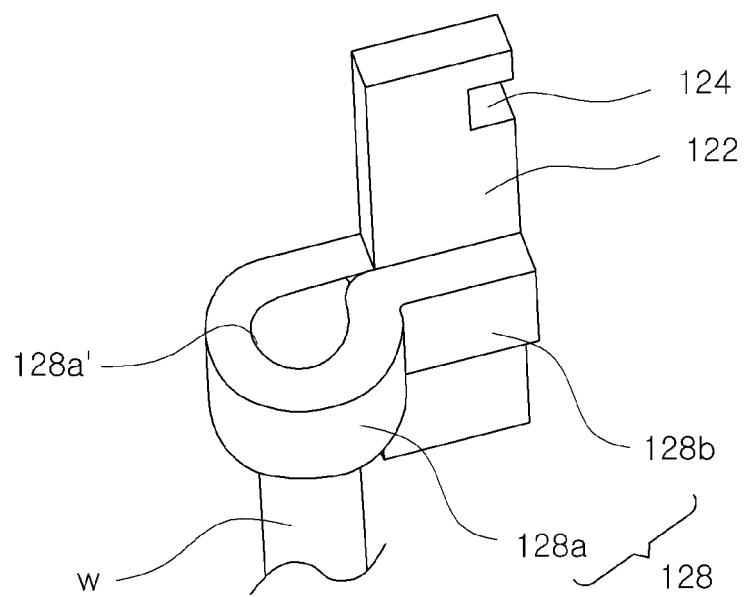

As illustrated in FIG. 6*b*, since the lead wire mounting portion 128*a* has the same shape as that of the lead wire W, the lead wire W of the coil C is connected to the lead wire mounting portion 128*a* while substantially maintaining the original shape and the close contact portion 128*b* is connected to the body 122. According to another embodiment, when the bobbin terminal 120 is electrically connected to the wire W by a fusing process having heating and pressing characteristics, the lead wire W of the coil C is prevented from being excessively deformed by the excessive compression by the connection rib 128, so that the original sectional shape of the lead wire W can be substantially maintained and thus sufficient strength can be ensured.

Figure 7:
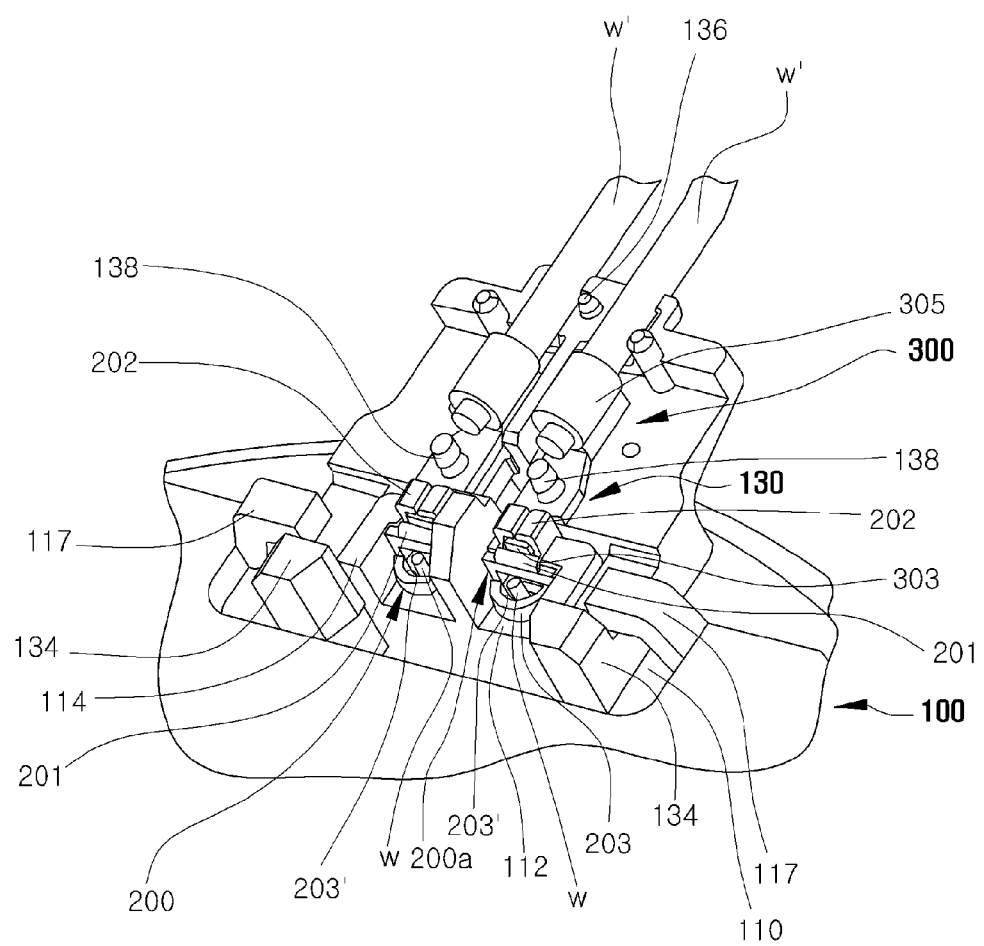
FIG. 7 is a perspective view illustrating the configuration of main elements according to further another embodiment of the present invention.

A bobbin terminal according to further another embodiment of the invention will be described with reference to FIG. 7. A bobbin terminal 200 according to further another embodiment is installed on the support portion 112 provided in the bobbin 110 of the core 100 and is prepared as a pair in correspondence with the wires W. The bobbin terminal 200 is electrically connected to a lead wire terminal 300 to electrically connect the coil C to the connector 130.

The bobbin terminal 200 according to further another embodiment includes a mounting plate 201 provided on a body 200*a* fixed to the support portion 112. The mounting plate 201 supports end portions of the lead wire terminal 300, that is, connection portions 303. In order to support both sides of the connection portion 303 of the lead wire terminal 300 mounted on the mounting plate 201, a pair of coupling portions 202 extending from both sides of the mounting plate 201 are provided in the bobbin terminal 200. The coupling portions 202 are bent to make contact with the upper surface of the connection portion 303, thereby supporting the lead wire terminal 300. According to further another embodiment as described above, the connection portion 303 of the lead wire terminal 300 is stably supported between the coupling portions 202 and the mounting plate 201.

The bobbin terminal 200 is provided with connection ribs 203. The connection ribs 203 surrounds the lead wires W of the coil to fix the lead wires W to the bobbin terminal 200. The connection rib 203 has a substantially arch shape. For example, the connection rib 203 is formed to extend from one side of the body 200*a* and has an insertion space 203' therein. The lead wire W of the coil is inserted into the insertion space 203' and the connection rib 203 is pressed by external force, so that the connection rib 203 is unfolded while pressing the lead wire W.

In order to allow the connection rib 203 deformed by the external force to closely make contact with the lead wire W, it is preferable that the connection rib 203 is formed in a cantilever shape such that only one end of the connection rib 203 is connected to the bobbin terminal 200. The shape of the connection rib 203 is not necessarily limited to the arch shape. For example, the connection rib 203 may have various shapes if the insertion space 203' can be formed therein.

The connection portion 303 is provided to the lead wire terminal 300 electrically connected to the bobbin terminal 200. The connection portion 303 substantially makes contact with the bobbin terminal 200, has a substantially plate shape as illustrated in FIG. 7, and is supported on the mounting plate 201 as described above. The lead wire terminal 300 includes splicing portions 305 extending from the connection portion 303. The splicing portion 305 surrounds and fixes a cable W' and simultaneously is electrically connected to the core wire of the cable W'.

According to further another embodiment, the connection rib 203 of the bobbin terminal 200 is electrically connected to the lead wire W of the coil by a fusing process accompanied by heating and pressing. Furthermore, as described above, the lead wire W closely makes contact with the bobbin terminal 200 by the pressure applied by the connection rib 203 in the fusing process, so that the stability of an electrical connection can be sufficiently ensured.

In the embodiments as described above, the supply of power to the lead wire W is performed through the bobbin terminal fixed to the bobbin and the lead wire terminal electrically connected to the bobbin terminal. The bobbin terminal and the lead wire terminal are manufactured separately from each other and are electrically connected to each other. The lead wire W may also be directly connected to a terminal through which a current can be supplied from an outside. That is, a terminal connected to an external power source may also be connected to the lead wire W through direct heating and pressing. In such a case, the terminal represents that the bobbin terminal is integrally formed with the lead wire terminal.

Still another embodiment of the invention will be described with reference to FIGS. 8 and 9. In the description of the embodiment, detailed description of the same elements as those in the previous embodiments will be omitted.

Figure 8:
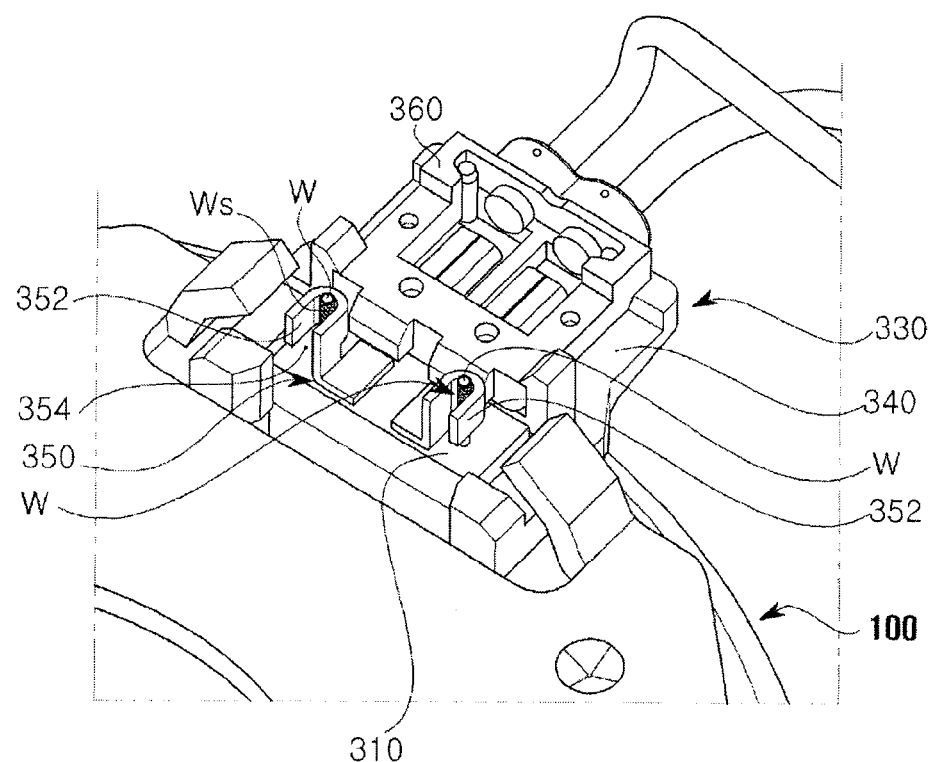
FIG. 8 is a perspective view illustrating the configuration of main elements according to still another embodiment of the present invention.
Figure 9:
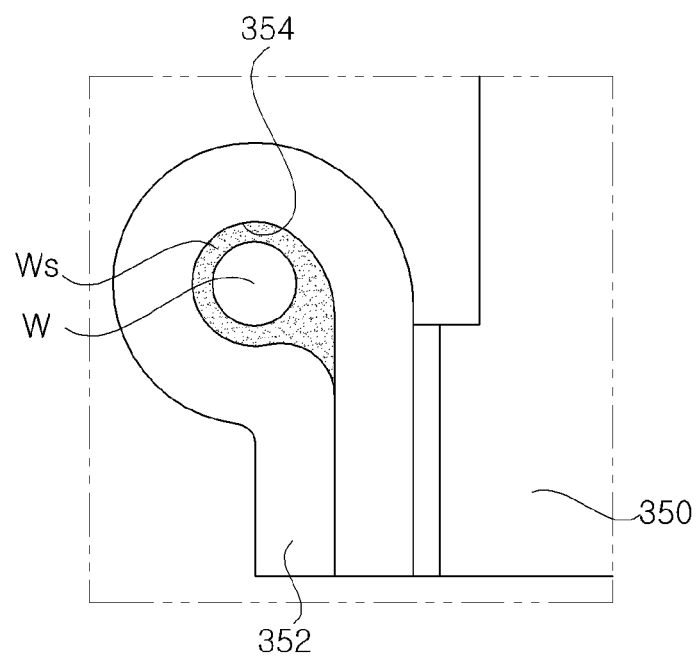
FIG. 9 is a sectional view of the main elements illustrated in FIG. 8 according to still another embodiment.

As illustrated in FIGS. 8 and 9, a core 100 forming the external appearance of a field coil assembly of an electromagnetic clutch of a compressor includes a bobbin 310 having a coil (not shown) for generating a magnetic field therein. Both ends of the coil protrude outward from the bobbin 310 to form lead wires W. The lead wire W is made of an aluminum (Al)-based material.

A connector 330 is coupled to one side of the core 100 in order to supply a current to the coil from an outside through the lead wires W. The connector 330 includes a holder 340 coupled to the core 100, terminals 350 mounted on the holder 340, and a clip 360 for fixing the terminals 350 to the holder 340.

Since the holder 340 and the clip 360 have configurations substantially equal to those of the holder and the clip as described in the previous embodiments, detailed description thereof will be omitted. The terminal 350 is made of a copper (Cu)-based material and fixed and supported between the holder 340 and the clip 360. Each terminal 350 is provided at an end thereof with a connection rib 352 substantially connected to the lead wire W. The connection rib 352 is formed to extend from one side of the front end of the terminal 350 while surrounding the lead wire W of the coil, and is electrically connected to the lead wire W.

The connection rib 352 is bent in an arc shape to surround the lead wire W and has a predetermined coupling space 354, into which the lead wire W can be inserted, therein. Thus, in the state in which the lead wire W of the coil is inserted into the coupling space 354 of the connection rib 352, the lead wire W and the terminal 350 are fixed to each other and electrically connected to each other in the fusing process of heating and pressing the connection rib 352.

According to still another embodiment, a solder layer Ws is formed at an end portion of the lead wire W connected to the connection rib 352 of the terminal 350. The solder layer Ws is used to couple the connection rib 352 of the terminal 350 to the core wire of the lead wire W to achieve an electrical connection therebetween. The solder layer Ws is formed by stripping an insulation coating of the lead wire W and coating solder on the core wire of the lead wire W. The solder layer Ws is melted by a fusing process to bond the core wire of the lead wire W to the connection rib 352 of the terminal 350. That is, according to still another embodiment, the connection rib 352 of the terminal 350 is electrically connected to the lead wire W by a fusing process.

The solder layer Ws is coated on the core wire of the lead wire W, from which the insulation coating is stripped, at a predetermined thickness. At this time, since an oxide film is formed at the core wire of the lead wire W through a surface contact with the air if the insulation coating is stripped therefrom, it is preferable to form the solder layer Ws by dipping the core wire of the lead wire W in a solder solution bath including an ultrasonic generator.

According to still another embodiment as described above, the solder layer Ws is formed at the end portion of the core wire of the lead wire W from which the insulation coating has been stripped and is electrically connected to the terminal 350 by the fusing process. FIG. 9 illustrates the portion of the terminal 350 in the state in which the end portion of the lead wire W is electrically connected to the connection rib 352 of the terminal 350 by the fusing process. By using the solder layer Ws, the terminal 350 can be firmly connected to the lead wire W even when the terminal 350 is made of copper as well as aluminum.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A field coil assembly of an electromagnetic clutch, the field coil assembly comprising:
   a bobbin from which lead wires, which are both ends of a coil made of an aluminum-based material, protrude outward;
   a core that surrounds the bobbin such that the lead wires are exposed;
   a bobbin terminal installed at the bobbin while being adjacent to the lead wire of the coil; and
   a connector coupled to the core and including a lead wire terminal,
   wherein the lead wires of the coil are connected to the bobbin terminal through heating and pressing, and
   wherein the bobbin terminal comprises:
      a body fixed onto the bobbin; and
      a connection rib extending horizontally from the body to surround the lead wires.

2. The field coil assembly of the electromagnetic clutch as claimed in claim 1, wherein the connection rib comprises:
   a lead wire mounting portion extending from the body to surround the lead wires; and
   a close contact portion extending from the lead wire mounting portion in parallel to the body.

3. The field coil assembly of the electromagnetic clutch as claimed in any one of claims 1, wherein a solder layer is formed at a core wire of a front end of the lead wire.

4. The field coil assembly of the electromagnetic clutch as claimed in claim 3, wherein the solder layer is formed by dipping the core wire of the lead wire in a solder solution.

5. The field coil assembly of the electromagnetic clutch as claimed in claim 4, wherein the solder layer is formed by dipping the core wire in a solder solution bath including an ultrasonic generator.

6. The field coil assembly of the electromagnetic clutch as claimed in claim 1, wherein the bobbin terminal is formed with a mounting recess and a connection portion provided at a front end of the lead wire terminal is locked with the mounting recess.

7. The field coil assembly of the electromagnetic clutch as claimed in claim 1, wherein the bobbin terminal comprises:
   a mounting plate having an upper surface on which a connection portion provided at a front end of the lead wire terminal is mounted; and
   a coupling portion extending from both sides of the mounting plate to support a side surface and an upper surface of the connection portion.

8. A field coil assembly of an electromagnetic clutch, the field coil assembly comprising:
   a bobbin from which lead wires, which are both ends of a coil made of an aluminum-based material, protrude outward;
   a core that surrounds the bobbin such that the lead wires are exposed;
   a bobbin terminal installed at the bobbin while being adjacent to the lead wire of the coil; and
   a connector coupled to the core and including a lead wire terminal,
   wherein the lead wires of the coil are connected to the bobbin terminal through heating and pressing,
   wherein the connector comprises:
   a holder fixed at one side of the core; and
   a clip coupled to the holder while fixedly interposing the lead wire terminal therebetween, and
   wherein the holder is provided with a guide boss and a fixing boss, the clip is formed with a guide hole and a coupling hole into which the guide boss and the fixing boss are inserted, and the holder and the clip are fixed to each other by a fusing process.

9. The field coil assembly of the electromagnetic clutch as claimed in claim 8, wherein the bobbin terminal is formed with a mounting recess and a connection portion provided at a front end of the lead wire terminal is locked with the mounting recess.

* * * * *